(12) United States Patent
Suckle et al.

(10) Patent No.: US 9,454,183 B2
(45) Date of Patent: Sep. 27, 2016

(54) ADJUSTABLE DOCKING STAND AND METHOD OF PROVIDING AND USING THE SAME

(71) Applicant: Belkin International, Inc., Playa Vista, CA (US)

(72) Inventors: Mitchell Suckle, Long Beach, CA (US); Eric Beaupre, Los Angeles, CA (US); Eric A. McDonald, Redondo Beach, CA (US); Avery Holleman, Long Beach, CA (US); Steven Lane, Orange, CA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

(21) Appl. No.: 14/450,019

(22) Filed: Aug. 1, 2014

(65) Prior Publication Data

US 2015/0036283 A1 Feb. 5, 2015

Related U.S. Application Data

(60) Provisional application No. 61/861,787, filed on Aug. 2, 2013.

(51) Int. Cl.
*G06F 1/16* (2006.01)

(52) U.S. Cl.
CPC .................... *G06F 1/1632* (2013.01)

(58) Field of Classification Search
CPC .. G06F 1/1632; G06F 1/1616; G06F 1/1626; G06F 1/166; F16M 11/10
See application file for complete search history.

(56) References Cited

U.S. PATENT DOCUMENTS

| | | | |
|---|---|---|---|
| 4,426,122 A * | 1/1984 | Lainez | A62B 18/082 361/679.55 |
| 6,193,546 B1 * | 2/2001 | Sadler | A45F 5/02 439/165 |
| 6,290,534 B1 * | 9/2001 | Sadler | A45F 5/02 439/164 |
| 6,716,058 B2 * | 4/2004 | Youn | G06F 1/1632 439/165 |
| 6,898,080 B2 * | 5/2005 | Yin | G06F 1/1632 361/679.41 |
| 7,014,486 B1 * | 3/2006 | Wu | G06F 1/1632 439/165 |
| 7,066,752 B2 * | 6/2006 | Hsu | H01R 13/62905 439/248 |
| 7,385,807 B1 * | 6/2008 | Chuang | G06F 1/1632 312/223.3 |
| 7,524,197 B2 | 4/2009 | Mills et al. | |
| 7,538,792 B2 * | 5/2009 | Takahashi | H04N 1/00204 348/207.1 |
| 7,719,830 B2 | 5/2010 | Howarth et al. | |
| 7,733,643 B1 * | 6/2010 | Rumpf | G11B 33/122 361/679.43 |

(Continued)

OTHER PUBLICATIONS

International Search Report and Written Opinion for PCT/US2014/049479, dated Nov. 27, 2014.

*Primary Examiner* — Xanthia C Cunningham
(74) *Attorney, Agent, or Firm* — Bryan Cave LLP

(57) ABSTRACT

A docking stand for an electronic device. The docking stand can include a bottom support surface configured to support a bottom side of the electronic device. The docking stand also can include a back support surface configured to support a side of the electronic device. The back support surface can be substantially upright when a base of the docking stand is placed on a substantially horizontal surface. The docking stand further can include a docking connector configured to removably attach to a docking port of the electronic device. The docking port can be proximate to the bottom side of the electronic device. The docking stand also can include an adjustment mechanism configured to adjust a height of the docking connector relative to the bottom support surface. Other embodiments are provided.

20 Claims, 11 Drawing Sheets

(56) References Cited

U.S. PATENT DOCUMENTS

| | | | |
|---|---|---|---|
| 7,931,494 B2* | 4/2011 | Long | H01R 13/6315 439/527 |
| 7,933,117 B2 | 4/2011 | Howarth et al. | |
| 8,241,050 B2* | 8/2012 | Xu | G06F 1/1632 439/247 |
| 8,559,172 B2* | 10/2013 | Byrne | G06F 1/1632 361/679.41 |
| 8,568,154 B2* | 10/2013 | Chang | H01R 13/6315 439/173 |
| 8,721,356 B2* | 5/2014 | Webb | G06F 1/1632 439/248 |
| 8,780,546 B2* | 7/2014 | Zhou | H01R 27/00 361/679.41 |
| 8,780,547 B2* | 7/2014 | Nakanishi | G03B 29/00 353/119 |
| 8,929,059 B2* | 1/2015 | Anwei | G06F 1/1632 248/229.22 |
| 8,986,029 B2* | 3/2015 | Webb | H05K 7/14 174/135 |
| 2006/0250764 A1* | 11/2006 | Howarth | G06F 1/1632 361/679.41 |
| 2007/0073952 A1* | 3/2007 | Tsai | G06F 1/1632 710/303 |
| 2007/0153463 A1* | 7/2007 | Choi | H04B 1/207 361/679.3 |
| 2007/0297130 A1* | 12/2007 | Fan | G06F 1/1632 361/679.44 |
| 2008/0089547 A1* | 4/2008 | Young | G11B 33/124 381/386 |
| 2008/0137285 A1* | 6/2008 | Chuang | G06F 1/1632 361/679.44 |
| 2008/0166896 A1* | 7/2008 | Choi | H01R 13/639 439/43 |
| 2008/0239658 A1* | 10/2008 | Chou | G06F 1/1632 361/679.38 |
| 2008/0259550 A1* | 10/2008 | Lien | B60R 11/0211 361/679.02 |
| 2008/0266783 A1 | 10/2008 | Mills et al. | |
| 2009/0009957 A1* | 1/2009 | Crooijmans | G06F 1/1632 361/679.41 |
| 2009/0129010 A1* | 5/2009 | Park | G06F 1/1632 361/679.56 |
| 2009/0213536 A1* | 8/2009 | Lewandowski | G06F 1/1632 361/679.43 |
| 2010/0062615 A1* | 3/2010 | Prest | H01R 35/00 439/38 |
| 2010/0118485 A1 | 5/2010 | Crooijmans et al. | |
| 2010/0149748 A1* | 6/2010 | Lam | G06F 1/1632 361/679.41 |
| 2012/0264329 A1 | 10/2012 | Hayashida et al. | |
| 2013/0058036 A1* | 3/2013 | Holzer | G06F 1/1632 361/679.44 |
| 2013/0162527 A1 | 6/2013 | Dahl | |
| 2013/0163186 A1* | 6/2013 | Mizusawa | H05K 7/14 361/679.41 |
| 2013/0170131 A1* | 7/2013 | Yen | G06F 1/1632 361/679.44 |
| 2013/0173035 A1 | 7/2013 | Fadell et al. | |
| 2014/0101720 A1* | 4/2014 | Xie | H04L 67/34 726/3 |
| 2014/0118923 A1* | 5/2014 | Stanley | G06F 1/1626 361/679.41 |

* cited by examiner

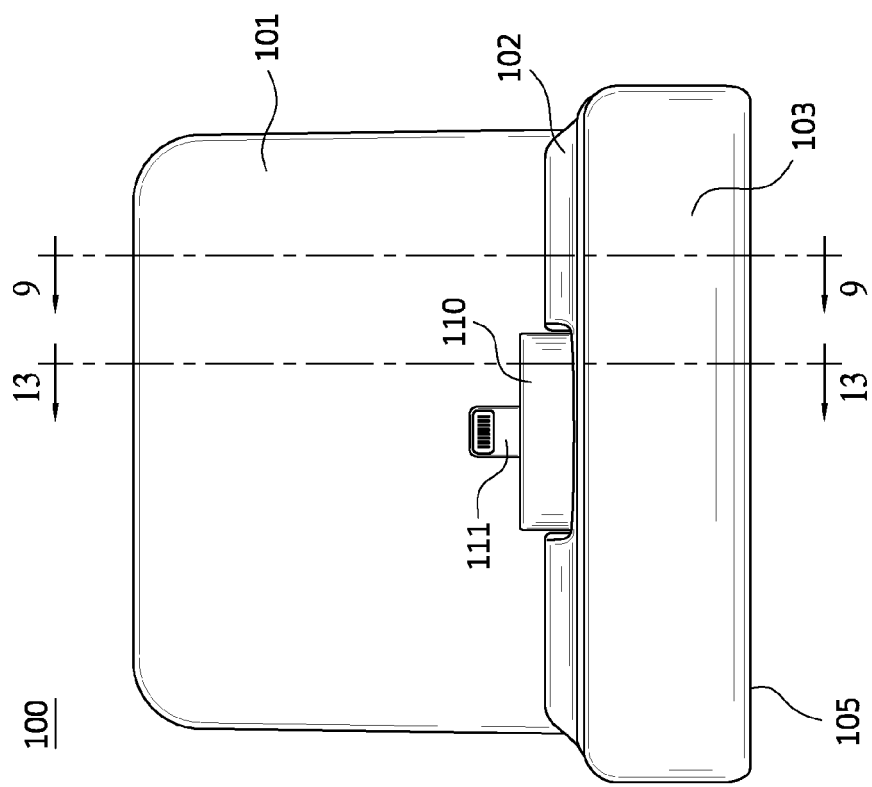
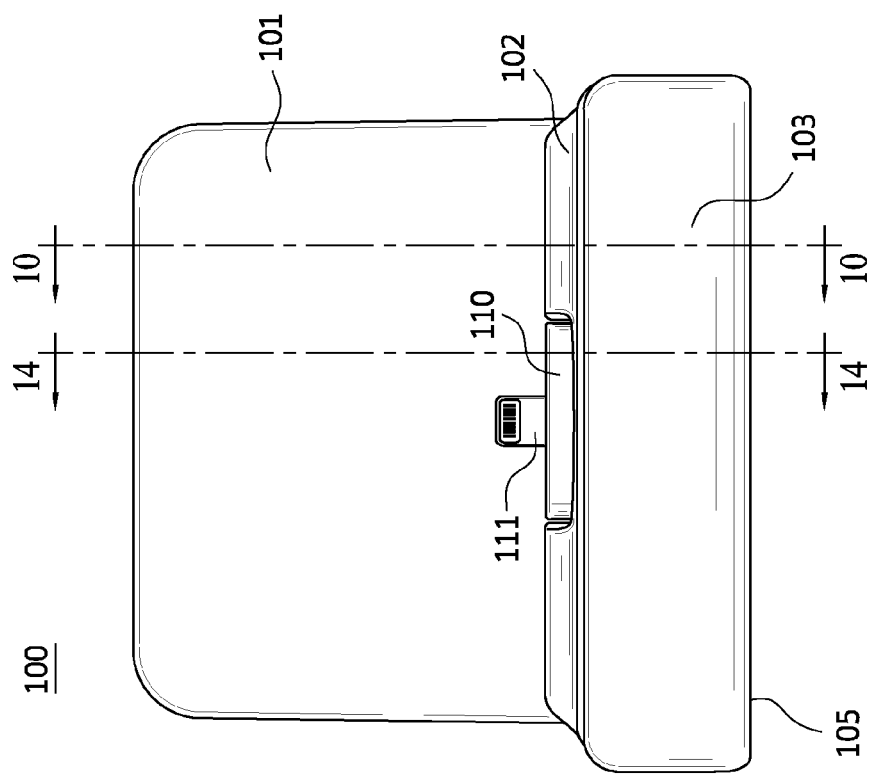

US 9,454,183 B2

1

ADJUSTABLE DOCKING STAND AND METHOD OF PROVIDING AND USING THE SAME

CROSS-REFERENCE TO RELATED APPLICATIONS

This application claims the benefit of U.S. Provisional Application No. 61/861,787, filed Aug. 2, 2013. U.S. Provisional Application No. 61/861,787 is incorporated herein by reference in its entirety.

TECHNICAL FIELD

This disclosure relates generally to docking stations for electrical devices, and relates more particularly to adjustable docking stands for mobile devices.

BACKGROUND

There exist today many types and styles of mobile electronic devices, such as smartphones, tablet computing devices, media players (e.g., music players and/or video players), etc., which can come in various shapes and/or sizes. Many of these mobile devices include docking ports that can interface with docking stands, and which can allow the mobile device to be readily connected to a power source and/or other peripheral devices. These docking ports can be at different locations on the various different mobile devices and/or can be hard to access with various docking stands. As such, various mobile devices can be difficult to use or even incompatible with various docking stands. Further, mobile devices are often used with device cases and/or skins, which can also make the docking port less accessible for use with various docking stands.

BRIEF DESCRIPTION OF THE DRAWINGS

To facilitate further description of the embodiments, the following drawings are provided in which:

FIG. 3 illustrates a front elevational view of the adjustable mobile-device docking stand of FIG. 1 with a docking connector in a lowered position;

FIG. 4 illustrates a front elevational view of the adjustable mobile-device docking stand of FIG. 1 with the docking connector in a raised position;

Figure 1:
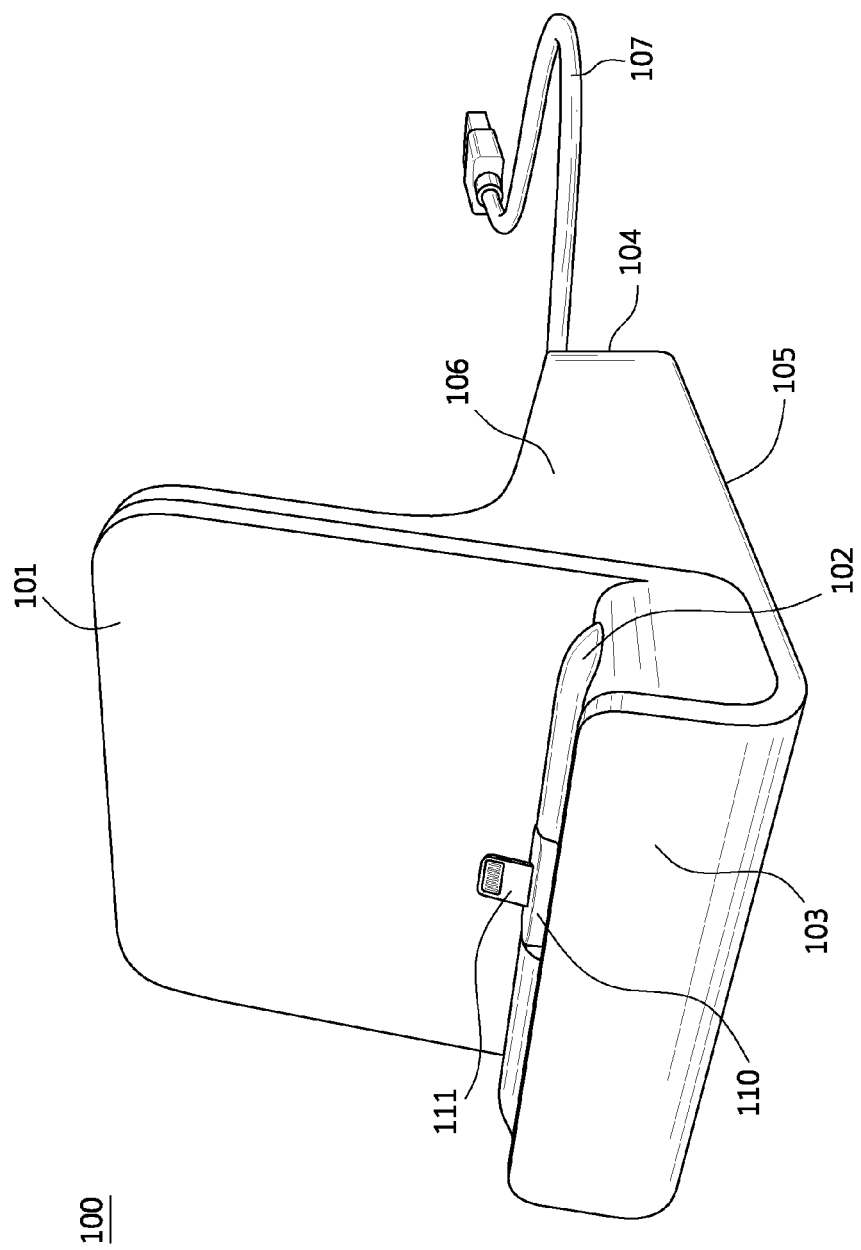
FIG. 1 illustrates a front, top, right side isometric view of an adjustable mobile-device docking stand, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable. "Mechanical coupling" and the like should be broadly understood and include mechanical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a docking stand for an electronic device. The docking stand can include a bottom support surface configured to support a bottom side of the electronic device. The docking stand also can include a back support surface configured to support a side of the electronic device. The back support surface can be substantially upright when a base of the docking stand is placed on a substantially horizontal surface. The docking stand further can include a docking connector configured to removably attach to a docking port of the electronic device. The docking port can be proximate to the bottom side of the electronic device. The docking stand also can include an adjustment mechanism configured to adjust a height of the docking connector relative to the bottom support surface.

A number of embodiments include a docking stand for an electronic device. The docking stand can include a bottom support surface configured to support a bottom side of the electronic device. The docking stand also can include a back support surface configured to support a face of the electronic device. The back support surface can be substantially upright when a base of the docking stand is placed on a substantially horizontal surface. The docking stand further can include a docking connector configured to removably attach to a docking port of the electronic device proximate to the bottom side of the electronic device. The docking connector can be configured to pivot frontward and rearward relative to the back support surface. The docking stand can be configured to support the docking connector in a substantially vertical configuration when the docking connector is detached from the docking port of the electronic device.

Several embodiments include a method of providing a docking stand for an electronic device. The method can include providing a bottom support surface configured to support a bottom side of the electronic device. The method also can include providing a back support surface configured to support a side of the electronic device. The back support surface can be substantially upright when a base of the docking stand is placed on a substantially horizontal surface. The method further can include providing a docking connector configured to removably attach to a docking port of the electronic device. The docking port can be proximate to the bottom side of the electronic device. The method also can include providing an adjustment mechanism configured to adjust a height of the docking connector relative to the bottom support surface.

Embodiments of an adjustable mobile-device docking stand can include a docking connector configured to be adjustable to various different positions. In some embodiments, the docking connector can be adjusted so as to be raised and lowered. The various different possible positions of the docking connector can allow the adjustable mobile-device docking stand to be used by various different mobile-devices and/or mobile-devices in various different cases with various different thicknesses. In certain embodiments, the adjustable mobile-device docking stand can be configured so as to hold the docking connector in a default upright position, which can facilitate for ease of docking the mobile device. In a number of embodiments, the adjustable mobile-device docking stand can be configured so as to allow the docking connector to pivot frontward and rearward.

Figure 2:
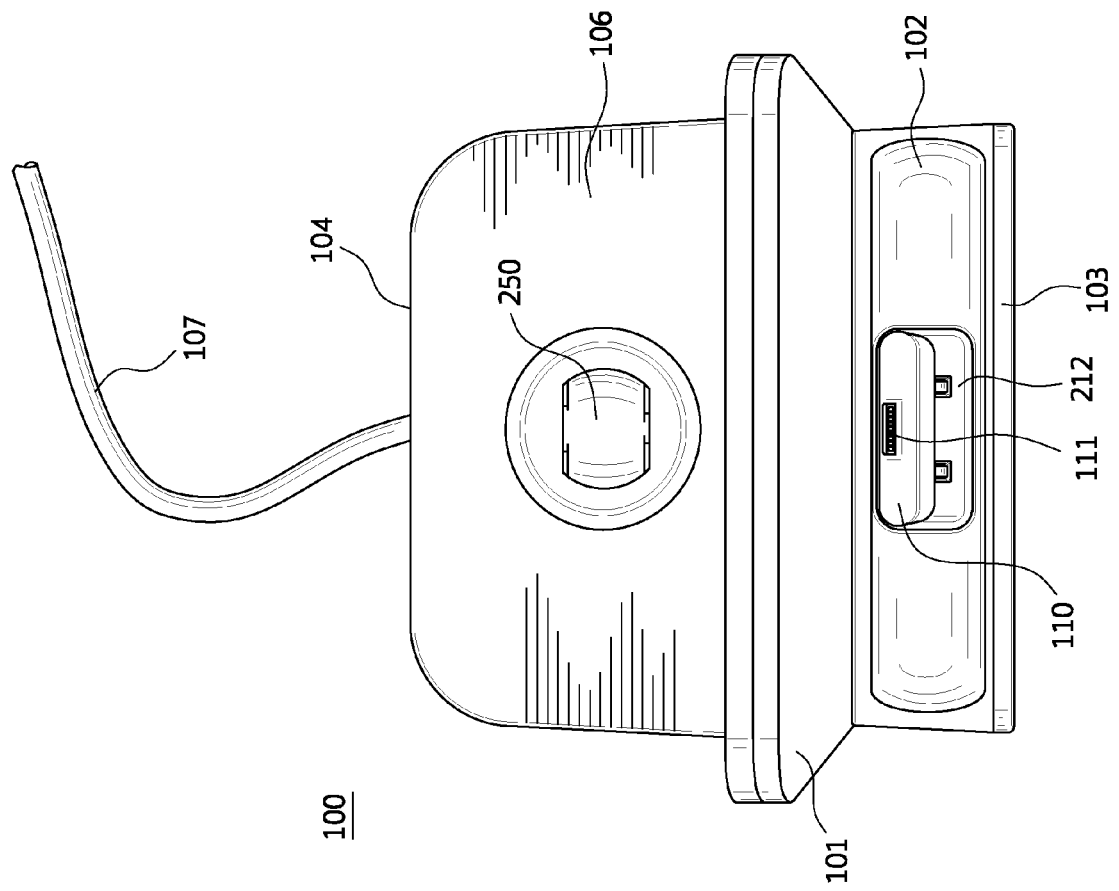
FIG. 2 illustrates a top plan view of the adjustable mobile-device docking stand of FIG. 1.

Turning to the drawings, FIG. 1 illustrates a front, top, right side isometric view of an adjustable mobile-device docking stand 100. FIG. 2 illustrates a top plan view of adjustable mobile-device docking stand 100. Adjustable mobile-device docking stand 100 is merely exemplary and embodiments of the adjustable mobile-device docking stand are not limited to embodiments presented herein. The adjustable mobile-device docking stand can be employed in many different embodiments or examples not specifically depicted or described herein. In a number of embodiments, adjustable mobile-device docking stand 100 can include a back support surface 101, a bottom support surface 102, a front 103, and/or a rear 104. In many embodiments, adjustable mobile-device docking stand 100 can include a stand base 105, a rear portion 106, and/or a stand cable 107. In some embodiments, adjustable mobile-device docking stand 100 can include a connector assembly 110. Connector assembly 110 can include a docking connector 111. In certain embodiments, adjustable mobile-device docking stand 100 can include a connector well 212, and connector assembly 110 can be located partially or fully within connector well 212. In some embodiments, bottom support surface 102 can include connector well 212. In a number of embodiments, connector assembly 110, docking connector 111, and/or connector well 212 can be located at bottom support surface 102, and in many embodiments, can be centered on bottom support surface 102 between the sides of adjustable mobile-device docking stand 100. Various components of adjustable mobile-device docking stand 100 can be made of a suitable rigid polymer (e.g., polycarbonate (PC, or acrylonitrile butadiene styrene (ABS)), metal, and/or ceramic material.

Docking connector 111 can be configured to connect with and/or removably attach to a docking port of a mobile device. For example, docking connector 111 can be a 30-pin dock connector, which is compatible with the iPhone 4 (and previous generations), the iPod Touch (4th generation and previous generations), the iPod Nano (6th generation and previous generations), and the iPad 3 (and previous generations), developed and sold by Apple, Inc., of Cupertino, Calif., among other devices. As another example, docking connector 111 can be a 8-pin Lightning connector, which is compatible with the iPhone 5, the iPod touch (5th generation), the iPad Nano (7th generation), and the iPad 4, developed and sold by Apple, Inc., among other devices.

Docking connector 111 can be another suitable docking connector for connecting adjustable mobile-device docking stand 100 to the docking port of a mobile device. The docking port can be proximate to the bottom side of the electronic device. In some embodiments, when the mobile device is connected to docking connector 111, the bottom of the mobile device can rest upon bottom support surface 102 and/or connector assembly 110.

In many embodiments, stand base 105 can have a sufficient dimension to prevent adjustable mobile-device docking stand 100 from tipping over when a mobile device is docked to docking connector 111. In some embodiments, stand base 105 can have a substantially rectangular shape, a substantially circular shape, a rounded rectangular shape, or another suitable shape for providing a support base for adjustable mobile-device docking stand 100. In a number of embodiments, a dimension of stand base 105 from side to side and/or a dimension of stand base 105 from front 103 to back 104 can be between approximately 3 and 5 inches.

In some embodiments, back support surface 101 can be substantially planar. When adjustable mobile-device docking stand 100 is placed on stand base 105 on a substantially horizontal surface, back support surface 101 can be substantially upright, such as substantially vertical and/or angled slightly rearward from vertical, so as to allow the back of the mobile device to be supported by back support surface 101. Back support surface 101 can support a side (e.g., a rear side) of the mobile device. Bottom support surface 102 can be substantially horizontal, or can be angled such that the rear portion of bottom support surface 102 is lower than the front portion of bottom support surface 102 when adjustable mobile-device docking stand 100 is placed on stand base 105 of a substantially horizontal surface. Bottom support surface 102 can support a bottom side of the mobile device. Such an angle can allow the mobile device, when docked to docking connector 111, to be angled rearward from vertical, so as to allow the back of the mobile device to be support by back support surface 101. In certain embodiments, such as adjustable mobile-device docking stand 100 shown in FIGS. 1-2, bottom support surface 102 can be curved convexly relative to docking stand 100 so as to protrude upward, which can facilitate docking to docking connector 111 of various mobile devices, such as for mobile device with docking ports above the bottom of the mobile devices or for mobile devices held by a mobile-device case.

In many embodiments, adjustable mobile-device docking stand 100 can include a stand cable 107. Stand cable 107 can be electrically coupled to docking connector 111. In some embodiments, stand cable 107 can extend from rear 104, and allow adjustable mobile-device docking stand 100 and/or the mobile device to be connected to one or more external resources or peripheral devices, such as a power source, a video display, a stereo system, a computer, a keyboard, an alarm clock, and/or other suitable resources or peripheral devices. For example, stand cable 107 can be a universal serial bus (USB) cable with a USB plug, which can connect to a computer, for example.

Adjustable mobile-device docking stand 100 can include an adjustment mechanism, such as adjustment wheel 250. In certain embodiments, rear portion 106 can include adjustment wheel 250. Adjustment wheel 250 can be used to raise and lower, or to otherwise adjust, docking connector 111 and/or docking assembly 110 with respect to bottom support surface 102 and/or adjustable mobile-device docking stand 100. In other embodiments, adjustment wheel 250 can be another suitable adjustment mechanism, such as an adjustment slider, an adjustment button, or another suitable adjust mechanism. In many embodiments, the adjustment mechanism, such as adjustment wheel 250, can be located at rear portion 106 of adjustable mobile-device docking stand 100 behind back support surface 101.

Turning ahead in the drawings, FIG. 3 illustrates a front elevational view of adjustable mobile-device docking stand 100 with docking connector 111 in a lowered position. FIG. 4 illustrates a front elevational view of adjustable mobile-device docking stand 100 with docking connector 111 in a raised position. As shown in FIGS. 3-4, connector assembly 110 and docking connector 111 can be adjusted, such as raised and lowered. For example, in one position, a top of connector assembly 110 can be substantially parallel with a top of bottom support surface 102, as shown in FIG. 3. In another position, a top of connector assembly 110 can be substantially higher than a top of bottom support surface 102, as shown in FIG. 4. In yet another position, a top of connector assembly 110 can be substantially lower than a top of bottom support surface 102. In certain embodiments, connector assembly 110 and/or docking connector 111 can be raised and/or lowered with respect to bottom support surface 102 such that the highest position is at least 5 millimeters higher than the lowest position. In other embodiments, the highest position of connector assembly and/or docking connector 111 can be at least 10, 15, 20, 25, or 30 millimeters higher than the lowest position.

Figure 6:
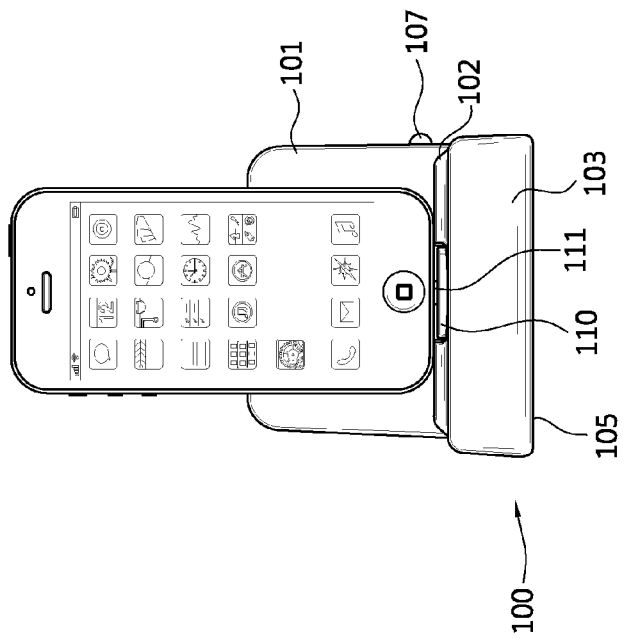
FIG. 6 illustrates a front elevational view of the adjustable mobile-device docking stand of FIG. 1 with the docking connector connected to a smartphone.
Figure 5:
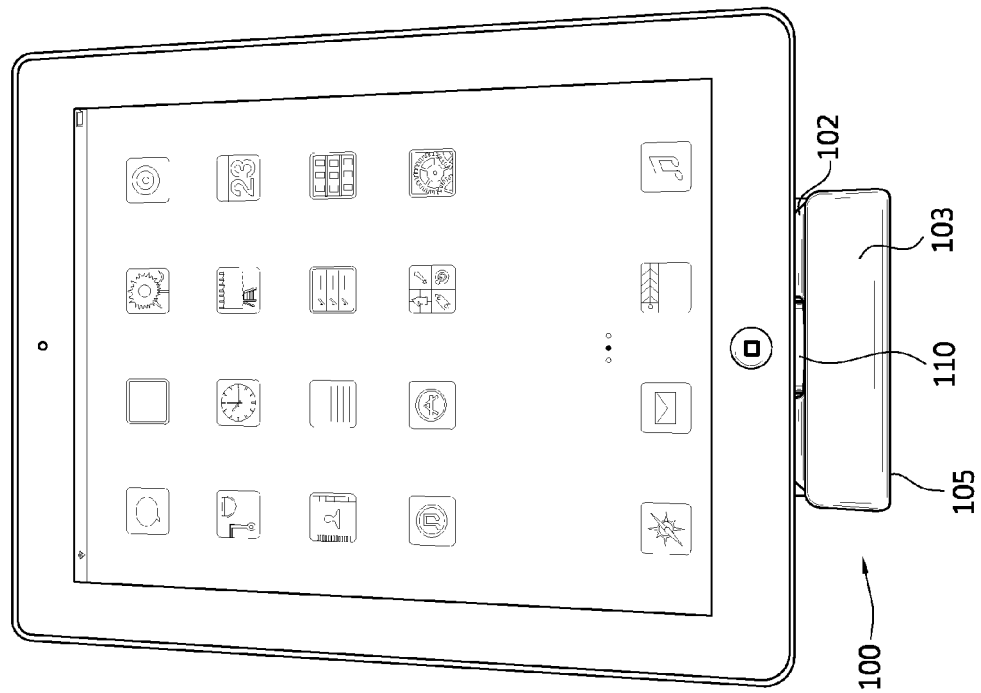
FIG. 5 illustrates a front elevational view of the adjustable mobile-device docking stand of FIG. 1 with the docking connector connected to a tablet computing device.

Turning ahead in the drawings, FIG. 5 illustrates a front elevational view of adjustable mobile-device docking stand 100 with docking connector 111 connected to an iPad 4. FIG. 6 illustrates a front elevational view of adjustable mobile-device docking stand 100 with docking connector 111 connected to an iPhone 5. For certain mobile devices, such as the iPad 4, the bottom of the mobile device extends below the opening for the docking port. For other mobile devices, such as the iPhone 5, the opening for the docking port is located on a bottom of the mobile device. In some embodiments, adjustable mobile-device docking stand 100 can be advantageously configured such that connector assembly 110 and/or docking connector 111 (not shown in FIG. 5) can be raised to connect with a mobile device having a docking port located above the bottom of the mobile device, such as the iPad 4, as shown in FIG. 5, and lowered to connect with a mobile device having a docking port located at the bottom of the mobile device, such as the iPhone 5, as shown in FIG. 6.

A wide variety of cases for mobile devices have been produced. Many of these cases include slots, openings, or apertures for the mobile device's docking port that allow the mobile device to be connected to a docking connector when the mobile device is held by the case. Many of these cases have varying thicknesses. In addition, certain cases can have protrusions or other undulations surrounding the slot for the docking port. In a number of embodiments, adjustable mobile-device docking stand 100 can be advantageously configured such that connector assembly 110 and/or docking connector 111 can be raised to connect with a mobile device inside a case having a thicker bottom portion, or lowered to connect with a mobile device inside a case having a thinner bottom portion.

Figure 7:
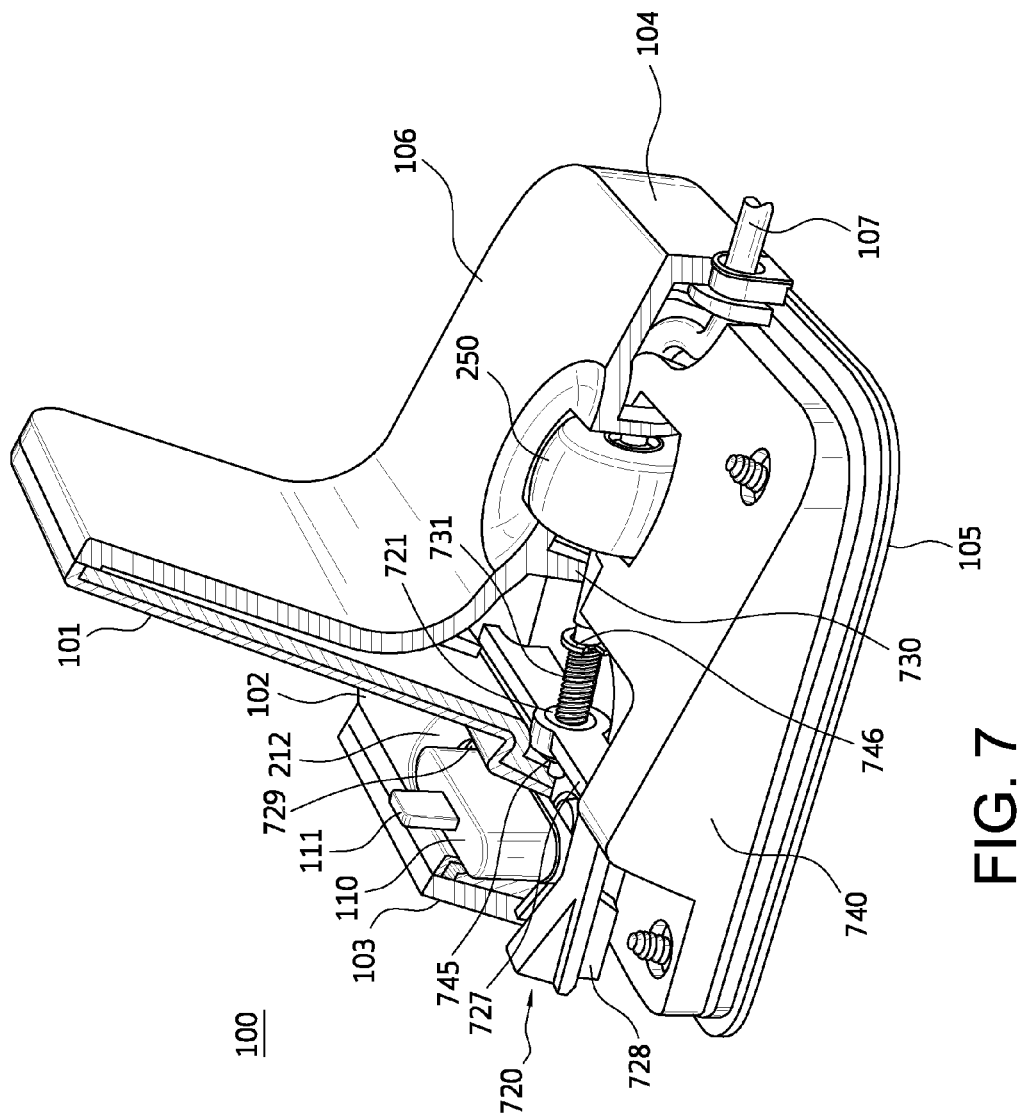
FIG. 7 illustrates a rear, top, right side cut-away isometric view of the adjustable mobile-device docking stand of FIG. 1.

Turning ahead in the drawings, FIG. 7 illustrates a rear, top, right side cut-away isometric view of adjustable mobile-device docking stand 100. In some embodiments, adjustable mobile-device docking stand 100 can include an adjustment sled 720. Adjustment sled 720 can include central sled portion 727, right side sled portion 728, and/or left side sled portion 729. Right side sled portion 728 can be substantially parallel to left side sled portion 729, and right side sled portion 728 and/or left side sled portion 729 can be orthogonal with central sled portion 727. Adjustment sled 720 can include a threaded sled portion 721. In many embodiments, threaded sled portion 721 can be centered between the sides of central sled portion 727. In a number of embodiments, adjustable mobile-device docking stand 100 can include an axle 730. Axle 730 can include threaded axle portion 731. In many embodiments, adjustable mobile-device docking stand 100 can include a base assembly 740. Base assembly 740 can include a front sled stop 745 and a rear sled stop 746.

Adjustment wheel 250 can be connected to axle 730, and, in many embodiments, can share a radial axis with axle 730. Threaded axle portion 731 can be threaded inside threaded sled portion 721, such that rotation of threaded axle portion 731 can cause threaded sled portion 721 to be adjusted and move frontward or rearward. In a number of embodiments, rotating adjustment wheel 250 clockwise when viewed from the front can cause adjustment sled 720 to move frontward. Further clockwise rotation of adjustment wheel 250 can cause adjustment sled 720 to move frontward until frontward adjustment is stopped by front sled stop 745. Rotating adjustment wheel counterclockwise when viewed from the front can cause adjustment sled 720 to move rearward. Further counterclockwise rotation of adjustment wheel 250 can cause adjustment sled 720 to move rearward until rearward adjustment is stopped by rear sled stop 746. In many embodiments, axle 730 can be centered between the sides of adjustable mobile-device docking stand 100.

Figure 8:
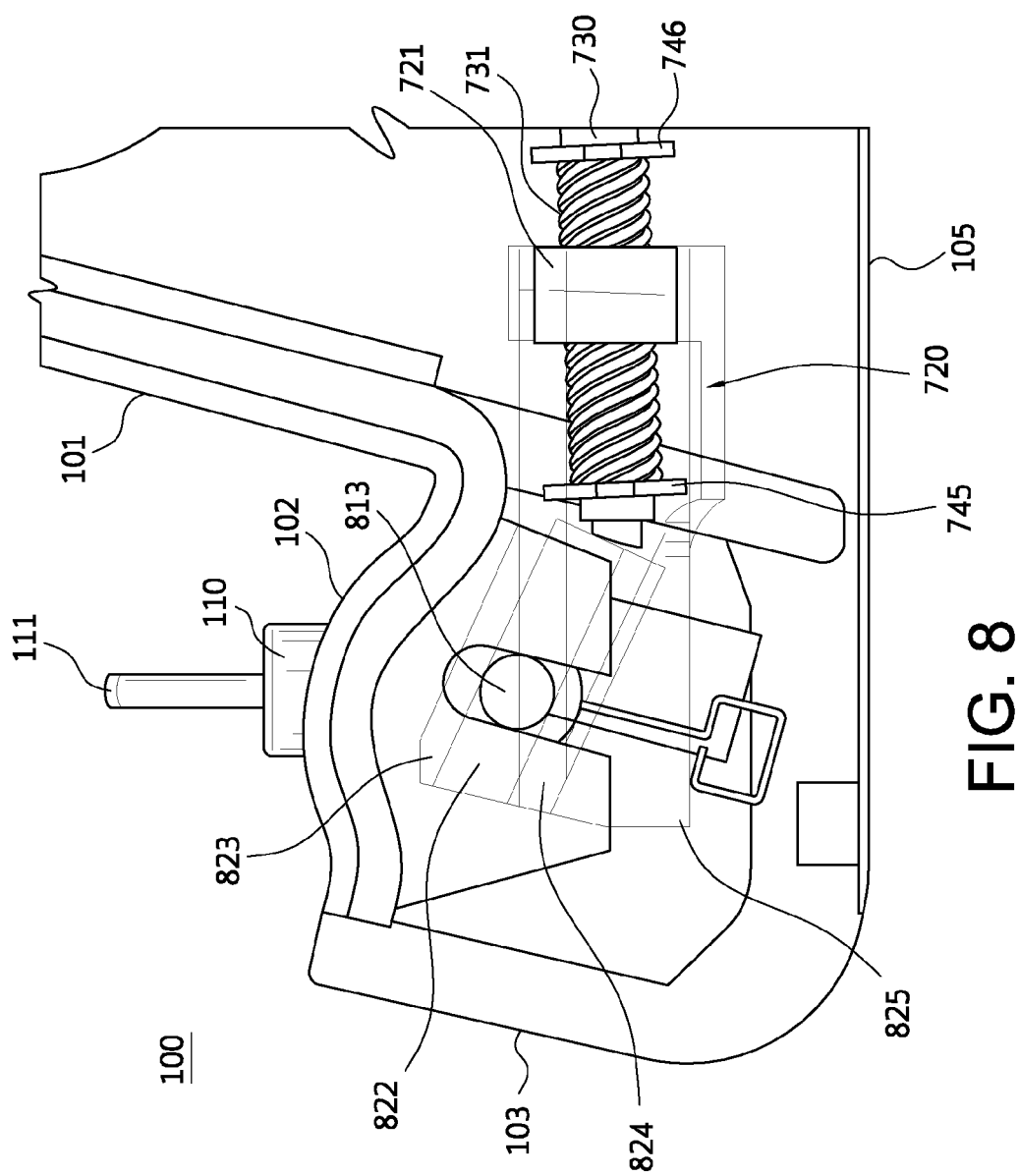
FIG. 8 illustrates a right side cross-sectional view of the adjustable mobile-device docking stand of FIG. 1, with the cross-section taken to the right of the connector assembly.
Figure 10:
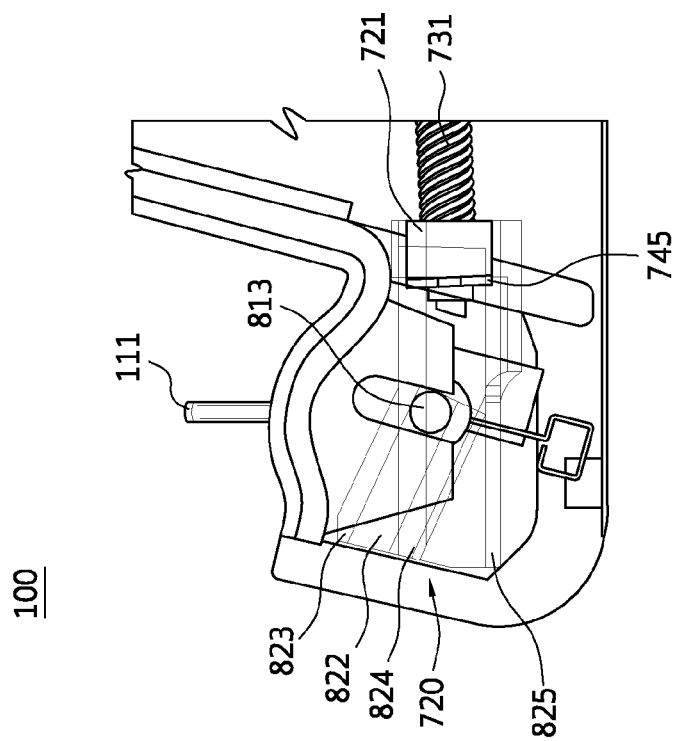
FIG. 10 illustrates a right side cross-sectional view of the adjustable mobile-device docking stand of FIG. 1, showing the docking connector in a lowered position, with the cross-section taken along cross-sectional line 10-10 in FIG. 3.
Figure 9:
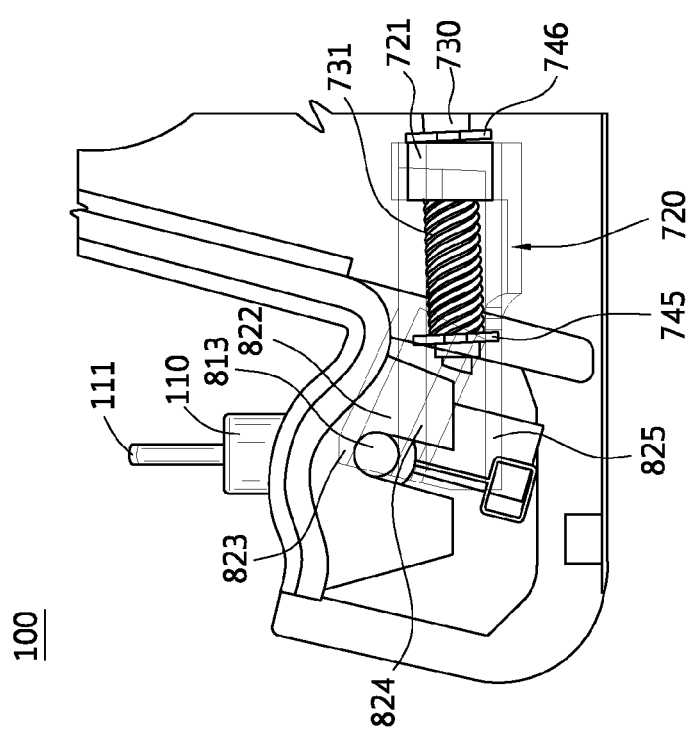
FIG. 9 illustrates a right side cross-sectional view of the adjustable mobile-device docking stand of FIG. 1, showing the docking connector in a raised position, with the cross-section taken along cross-sectional line 9-9 in FIG. 4.
Figure 11:
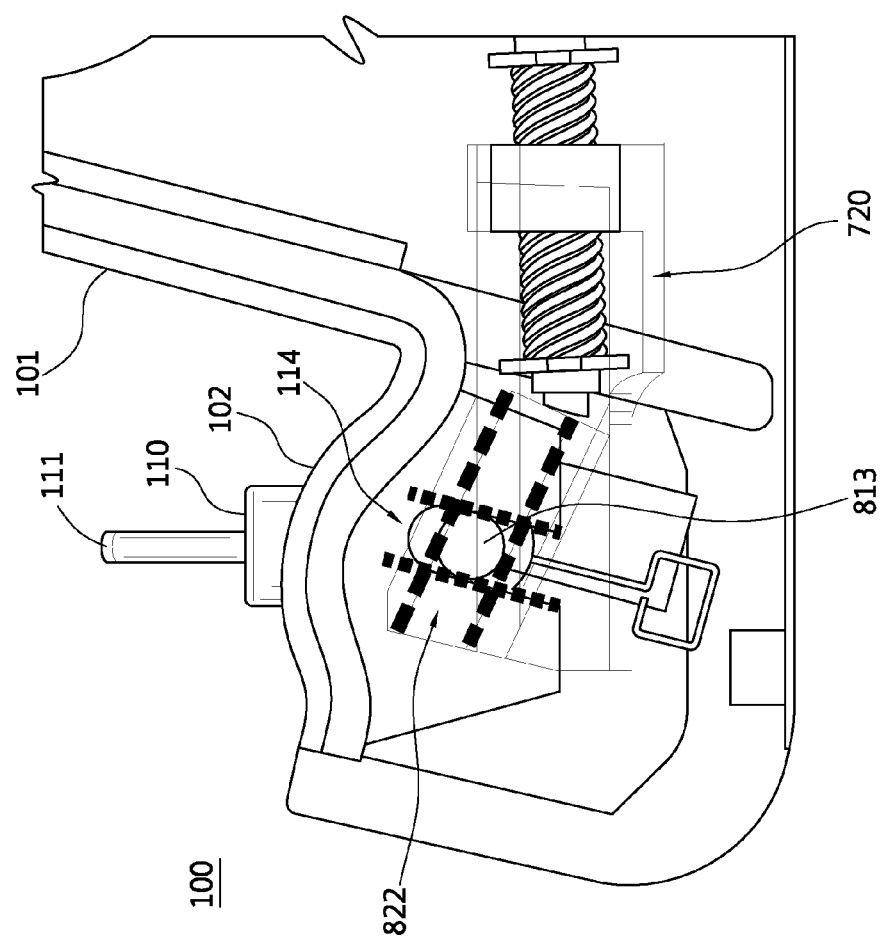
FIG. 11 illustrates a right side cross-sectional view of the adjustable mobile-device docking stand of FIG. 1, showing adjustment channels of the adjustable mobile-device docking stand, with the cross-section taken to the right of the connector assembly.

Turning ahead in the drawings, FIG. 8 illustrates a right side cross-sectional view of adjustable mobile-device docking stand 100, with the cross-section taken to the right of connector assembly 110. FIG. 9 illustrates a right side cross-sectional view of adjustable mobile-device docking stand 100, showing docking connector 111 in a raised position, with the cross-section taken along cross-sectional line 9-9 in FIG. 4. FIG. 10 illustrates a right side cross-sectional view of adjustable mobile-device docking stand 100, showing docking connector 111 in a lowered position, with the cross-section taken along cross-sectional line 10-10 in FIG. 3. FIG. 11 illustrates a right side cross-sectional view of adjustable mobile-device docking stand 100, showing adjustment channels of adjustable mobile-device docking stand 100, with the cross-section taken to the right of connector assembly 110. In many embodiments, right side portion 728 (FIG. 7) and/or left side portion 729 (FIG. 7) of adjustment sled 720 can include a sled alignment portion 825. In certain embodiments, sled alignment portion 825 can include one or more rails or grooves than can engage with base assembly 740 (FIG. 7). Sled alignment portion 825 can be configured to align the adjustment of adjustment sled 720 such that adjustment sled 720 can slide can be adjusted frontward and rearward, and such that the movement of adjustment sled 720 is substantially horizontal in a frontward/rearward direction when adjustable mobile-device docking stand 100 is placed on a substantially horizontal surface. In many embodiments, adjustment of adjustment wheel 250 can move adjustment sled 720 substantially parallel with stand base 105. In a number of embodiments, right side portion 728 (FIG. 7) and/or left side portion 729 (FIG. 7) of adjustment sled 720 can include a sled channel 822 between a sled channel top 823 and a sled channel bottom 824. Connector assembly 110 can include a connector assembly pivot 813 on one or both sides of connector assembly 110. In many embodiments, connector assembly pivot 813 can have a circular cross section when viewed from the side, and/or can be configured to fit within and/or slide along sled channel 822. Sled channel top 823 and/or sled channel bottom 824 can secure connector assembly pivot 813 within sled channel 822.

Figure 12:
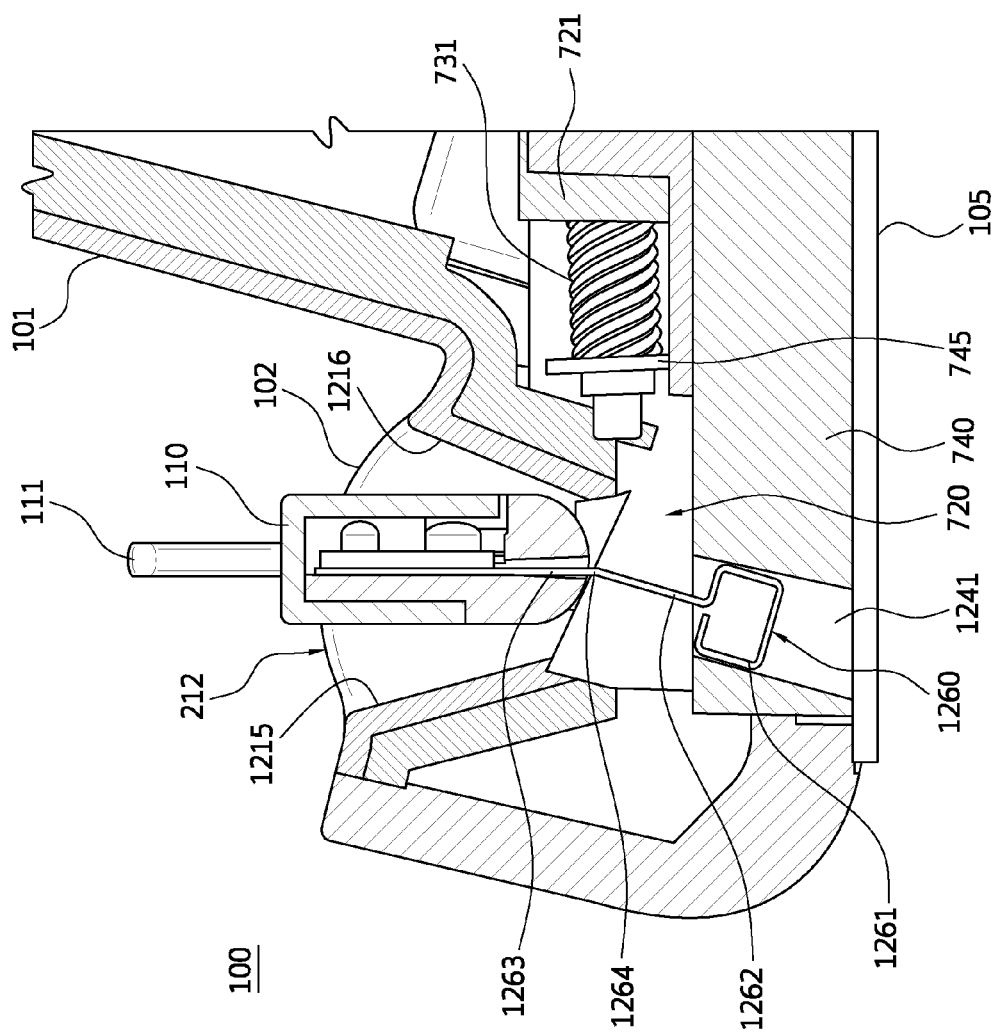
FIG. 12 illustrates a right side cross-sectional view of the adjustable mobile-device docking stand of FIG. 1, with the cross-section taken through the connector assembly and to the right of the docking connector.
Figure 14:
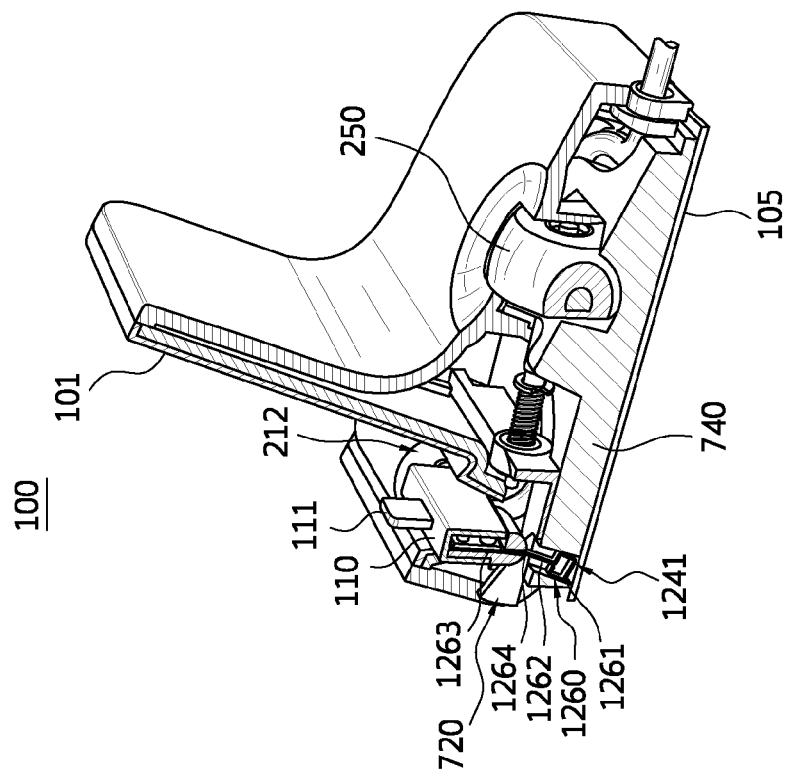
FIG. 14 illustrates a top, rear, right side isometric cross-sectional view of the adjustable mobile-device docking stand of FIG. 1, with the docking connector in a lowered position and with the cross-section taken along cross-sectional line 14-14 in FIG. 3.
Figure 13:
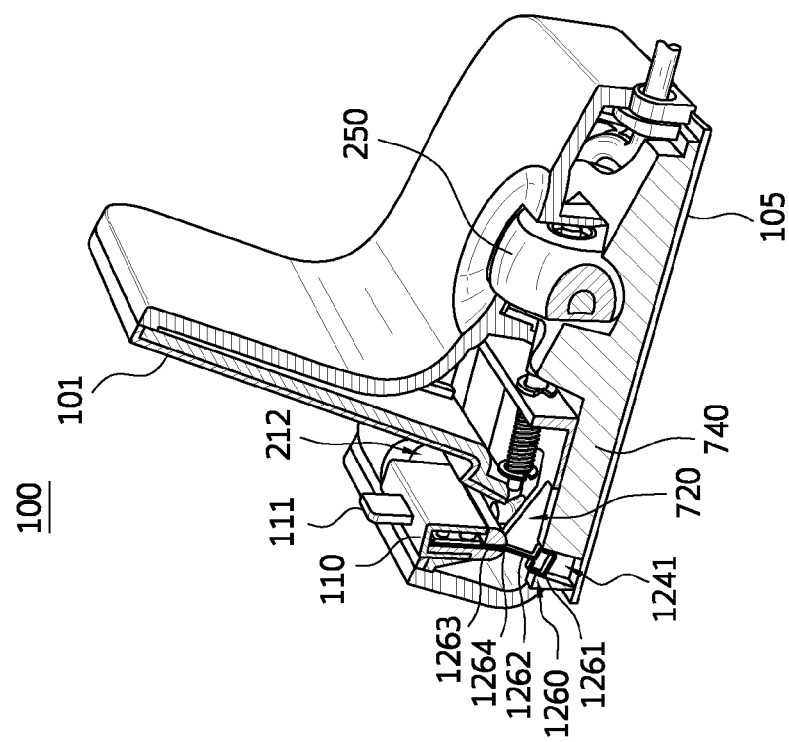
FIG. 13 illustrates a top, rear, right side isometric cross-sectional view of the adjustable mobile-device docking stand of FIG. 1, with the docking connector in a raised position and with the cross-section taken along cross-sectional line 13-13 in FIG. 4.

In several embodiments, when adjustable mobile-device docking stand 100 is placed on a substantially horizontal surface, sled channel 822 can have an angled incline toward the front of adjustable mobile-device docking stand 100, such that the front portion of sled channel 822 is located above the rear portion of sled channel 822. In many embodiments, adjustment of adjustment wheel 250 can adjust the height of connector assembly pivot 813 within sled channel 822 and/or adjust the height of connector assembly 110 and/or docking connector 111 relative to bottom support surface 102. For example, by rotating adjustment wheel 250 such that adjustment sled 720 is moved rearward, connector assembly pivot 813 can be adjusted upward, such that connector assembly 110 and/or docking connector 111 can be raised, as shown in FIG. 9. By rotating adjustment wheel 250 such that adjustment sled 720 is moved frontward, connector assembly pivot 813 can be adjusted downward, such that connector assembly 110 and/or docking connector 111 can be lowered, as shown in FIG. 10. As emphasized in FIG. 11, as adjustment sled 720 moves frontward and rearward, sled channel 822 (shown with dashed lines) moves frontward and rearward, and connector assembly pivot 813, connector assembly 110, and/or docking connector 111 can be raised and/or lowered along a pivot channel 1114 (shown with dotted lines). In a number of embodiments, connector assembly pivot 813 can be retained within pivot channel 1114 by support surfaces along the dotted lines. In other embodiments, connector assembly pivot 813 can be guided along pivot channel 1114 by another mechanism, such as a spring channel, as shown in FIGS. 12-14 and described below. In many embodiments, pivot channel 1114 can be substantially parallel to back support surface 101. In other embodiments, pivot channel 1114 can be substantially vertical when adjustable mobile-device docking stand 100 is placed on a substantially horizontal surface.

Turning ahead in the drawings, FIG. 12 illustrates a right side cross-sectional view of adjustable mobile-device docking stand 100, with the cross-section taken through connector assembly 110 and to the right of docking connector 111. FIG. 13 illustrates a top, rear, right side cross-sectional isometric view of adjustable mobile-device docking stand 100, with docking connector 111 in a raised position and with the cross-section taken along cross-sectional line 13-13 in FIG. 4. FIG. 14 illustrates a top, rear, right side cross-sectional isometric view of adjustable mobile-device docking stand 100, with docking connector 111 in a lowered position and with the cross-section taken along cross-sectional line 14-14 in FIG. 3. In a number of embodiments, base assembly 740 can include a spring channel 1241. In some embodiments, spring channel 1241 can be substantially vertical. In other embodiments, spring channel 1241 can be angled rearward. For example, spring channel 1241 can be angled such that it is parallel to pivot channel 1114 (FIG. 11) and/or back support surface 101. In several embodiments, adjustable mobile-device docking stand 100 can include at least one centering spring 1260. Centering spring 1260 can include a centering spring stabilizer 1261. Centering spring stabilizer 1261 can be configured to fit within spring channel 1241 and/or can slide upward and downward within spring channel 1241. In some embodiments, centering spring 1260 can include a centering spring plate 1263, which can be connected to centering spring stabilizer 1261 by a centering spring connector 1262. In certain embodiments, centering spring 1260 can include a centering spring bend 1264. In some embodiments, centering spring bend can be located at an interface between centering spring plate 1263 and centering spring connector 1262. In a number of embodiments, centering spring plate 1263 can be connected to connector assembly 110 and/or docking connector 111. In many embodiments, centering spring plate 1263 can be substantially vertical when adjustable mobile-device docking stand 100 is placed on a substantially horizontal surface.

In many embodiments, connector assembly 110 and/or docking connector 111 is raised or lowered, such as by adjustment of adjustment sled 720, as described above, and centering spring 1260 can be raised or lowered, such that centering spring stabilizer 1261 is raised or lowered within spring channel 1241. In a number of embodiments, adjustable mobile-device docking stand 100 can support connector assembly 110 and/or docking connector 111 in a substantially vertical configuration when docking connector 111 is detached from the docking port of the electronic device, as shown in FIGS. 8-12. For example, In many embodiments, centering spring stabilizer 1261 can be of sufficient dimension so as to be able to be guided upward and downward by spring channel 1241 and/or to maintain the centering spring plate 1263, connector assembly 110, and/or docking connector 111 in a substantially vertical position. Centering spring connector 1262 can extend from centering spring stabilizer 1261 to centering spring plate 1263 and/or connector assembly 110. In some embodiments, centering spring connector 1262 can be angled such that it is parallel to spring channel 1241 and/or back support surface 101. Centering spring bend 1264 can be an angled bend in centering spring 1260, such that centering spring plate 1263, connector assembly 110, and/or docking connector 111 are substantially vertical and such that spring channel 1241 and/or centering spring connector 1262 are angled. For example, adjustment wheel 250 can be rotated clockwise when viewed from the front, which can move adjustment sled 720 rearward, and lower connector assembly pivot 813 (FIG. 8), connector assembly 110, and/or docking connector 111, and docking connector 111 can be maintained in a substantially vertical position by centering spring 1260, with centering spring stabilizer 1261 adjusting upward within spring channel 1241, as shown in FIG. 13. Similarly, adjustment wheel 250 can be rotated counterclockwise when viewed from the front, which can move adjustment sled 720 frontward, and raise connector assembly pivot 813 (FIG. 8), connector assembly 110, and/or docking connector 111, and docking connector 111 can be maintained in a substantially vertical position by centering spring 1260, with centering spring stabilizer 1261 adjusting downward within spring channel 1241, as shown in FIG. 14. In other embodiments, centering spring plate 1263, connector assembly 110, and/or docking connector 111 can be angled so as to be parallel to spring channel 1241, centering spring connector 1262, and/or back support surface 101, or can be at another suitable angle.

In some embodiments, centering spring 1260 can be made of an rigid elastic material, such as a spring steel, or another suitable material. In many embodiments, centering spring 1260 can bend elastically at centering spring bend 1264, such that centering spring plate can pivot around centering spring bend 1264. In a number of embodiments, centering spring bend can be located substantially between each side of connector assembly pivot 813 (FIG. 8). In many embodiments, centering spring 1260 can be configured to facilitate connector assembly 110 pivoting around connector assembly pivot 813 (FIG. 8) and/or centering spring bend 1264. Connector well 212 can include a connector well front wall 1215 and/or a connector well rear wall 1216. In certain embodiments, connector well 212 can be fanned out upward toward bottom support surface 102. For example, connector well front wall 1215 and connector well rear wall 1216 can be angled and/or fanned out such that the distance between the connector well front wall 1215 and connector well rear wall 1216 is greater further upward closer to bottom support surface 102 than further downward closer to stand base 105. Such angled surfaces can allow connector assembly 110 and/or docking connector 111 to pivot around connector assembly pivot 813 (FIG. 8) and extend frontward to connector well front wall 1215 and/or extend rearward to connector well rear wall 1216.

In many embodiments, connector assembly 110 and/or docking connector 111 can pivot frontward and/or rearward relative to back support surface 101. In several embodiments, centering spring 1260 can allow connector assembly 110 and/or docking connector 111 to pivot frontward and/or rearward related to back support surface 101. In a number of embodiments, connector assembly 110 and/or docking connector 111 can be raised and/or lowered within connector well 212.

In many embodiments, when adjustable mobile-device docking stand 100 is placed on a substantially horizontal surface, centering spring 1260 can hold centering spring plate 1263, connector assembly 110, and/or docking connector 111 in a substantially vertical default position so that, when a mobile device is not connected to docking connector 111, connector assembly 110 is not being bent frontward or rearward. This default vertical position of connector assembly 110 and/or docking connector 111 can advantageously facilitate ease of docking the mobile device with docking connector 111, such that the mobile device can be docked with adjustable mobile-device docking stand 100 by simply holding the mobile device vertically over docking connector 111 and pushing the mobile device downward in a substantially vertical direction. In many embodiments, when the mobile device is connected to docking connector 111, centering spring 1260 can be configured such that the weight of the mobile device can cause centering spring plate 1263, connector assembly 110, and/or docking connector 111 to pivot rearwards such that the mobile device and or/the mobile-device case rests against and/or is supported by back support surface 101, and/or such that centering spring plate 1263, connector assembly 110, and/or docking connector 111 is substantially parallel to back support surface 101. In many embodiments, connector assembly 110 and/or docking connector 111 can have a default vertical position and/or can pivot around connector assembly pivot 813 (FIG. 8) when in a raised position, as shown in FIG. 13. In some embodiments, connector assembly 110 and/or docking connector 111 can have a default vertical position and/or can pivot around connector assembly pivot 813 (FIG. 8) when in a lowered position, as shown in FIG. 14.

Figure 15:
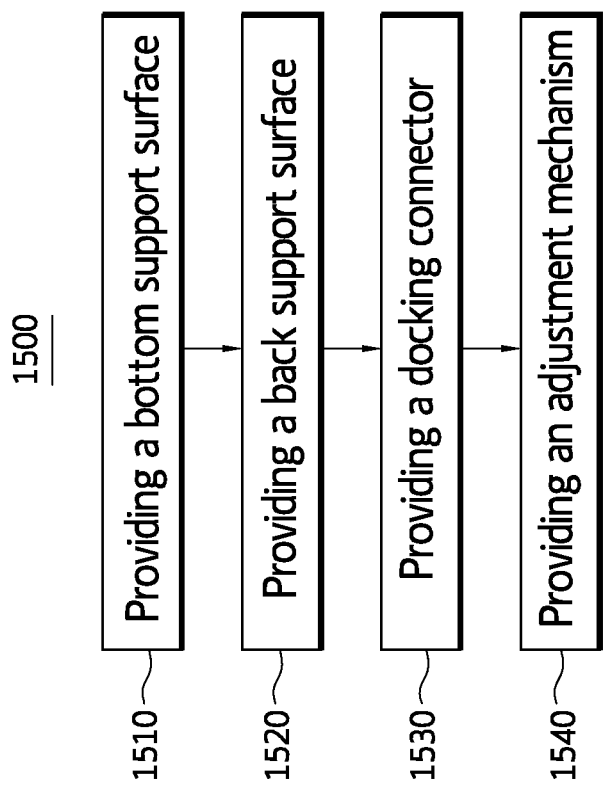
FIG. 15 illustrates a flow chart for a method of providing a docking stand for an electronic device, according to an embodiment.

Turning ahead in the drawings, FIG. 15 illustrates a flow chart for an embodiment of a method 1500 of providing a docking stand for an electronic device. Method 1500 is merely exemplary and is not limited to the embodiments presented herein. Method 1500 can be employed in many different embodiments or examples not specifically depicted or described herein. In some embodiments, the procedures, the processes, and/or the activities of method 1500 can be performed in the order presented. In other embodiments, the procedures, the processes, and/or the activities of the method 1500 can be performed in any other suitable order. In still other embodiments, one or more of the procedures, the processes, and/or the activities in method 1500 can be combined or skipped. In some embodiments, the docking stand can be similar or identical to adjustable mobile-device docking stand 100 (FIG. 1). The electronic device can be the mobile device.

Referring to FIG. 15, method 1500 can include a block 1510 of providing a bottom support surface. In many embodiments, the bottom support surface can be similar or identical to bottom support surface 102 (FIG. 1). In certain embodiments, the bottom support surface can be configured to support a bottom side of the electronic device.

In some embodiments, method 1500 can include a block 1520 of providing a back support surface. In several embodiments, the back support surface can be similar or identical to back support surface 101 (FIG. 1). In many embodiments, the back support surface can be configured to support a side of the electronic device. For example, the back support surface can be configured to support a back side of the electronic device. In a number of embodiments, the back support surface can be substantially upright when a base of the docking stand is placed on a substantially horizontal surface. In a number of embodiments, the base of the docking stand can be similar or identical to stand base 105 (FIG. 1).

In a number of embodiments, method 1500 can include a block 1530 of providing a docking connector. In some embodiments, the docking connector can be similar or identical to docking connector 111 (FIG. 1). In many embodiments, the docking connector can be configured to removably attach to a docking port of the electronic device. The docking port can be proximate to the bottom side of the electronic device. In certain embodiments, the docking connector can be configured to pivot frontward and rearward relative to the back support surface. In several embodiments, the docking stand can be configured to support the docking connector in a substantially vertical configuration when the docking connector is detached from the docking port of the electronic device.

In many embodiments, method 1500 can include a block 1540 of providing an adjustment mechanism. In some embodiments, the adjustment mechanism can be similar or identical to adjustment mechanism 250 (FIG. 2). In several embodiments, the adjustment mechanism can be configured to adjust a height of the docking connector relative to the bottom support surface.

Although the adjustable mobile-device docking stand has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that various elements of FIGS. 1-15 may be modified, and that the foregoing discussion of certain of these embodiments does not necessarily represent a complete description of all possible embodiments. As another example, one or more of the procedures, processes, or activities of FIG. 15 may include different procedures, processes, and/or activities and be performed in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A docking stand for an electronic device comprising:
   a bottom support surface configured to support a bottom side of the electronic device;
   a back support surface configured to support a side of the electronic device, the back support surface being substantially upright when a base of the docking stand is placed on a substantially horizontal surface;
   a docking connector configured to removably attach to a docking port of the electronic device, the docking port being proximate to the bottom side of the electronic device;
   an adjustment mechanism configured to adjust a height of the docking connector relative to the bottom support surface; and
   a connector assembly comprising the docking connector,
   wherein:
   the bottom support surface comprises a connector well; and
   the connector assembly is configured to be raised and lowered within the connector well.

2. The docking stand of claim 1, wherein the adjustment mechanism comprises an adjustment wheel.

3. The docking stand of claim 1, wherein the adjustment mechanism is located at a rear portion of the docking stand behind the back support surface.

4. The docking stand of claim 1, wherein:
   the docking connector is configured to pivot frontward and rearward relative to the back support surface; and
   the docking stand is configured to support the docking connector in a substantially vertical configuration when the docking connector is detached from the docking port of the electronic device.

5. The docking stand of claim 1, wherein the bottom support surface is convexly curved relative to the docking stand.

6. The docking stand of claim 1, wherein a rear portion of the bottom support surface is lower than a front portion of the bottom support surface when the base of the docking stand is placed on the substantially horizontal surface.

7. The docking stand of claim 1 further comprising a cable comprising a USB plug.

8. The docking stand of claim 1, wherein the docking connector comprises an eight-pin Lightning connector.

9. The docking stand of claim 1, wherein the connector well is fanned out upward toward the bottom support surface.

10. The docking stand of claim 1 further comprising:
an adjustment sled comprising a channel,
wherein:
- a first portion of the channel is higher than a second portion of the channel when the base of the docking stand is placed on the substantially horizontal surface;
- an adjustment of the adjustment mechanism is configured to move the adjustment sled substantially parallel with the base of the docking stand and adjust a height of a connector assembly pivot within the channel;
- the adjustment mechanism comprises an adjustment wheel; and
- the adjustment mechanism is located at a rear portion of the docking stand behind the back support surface.

11. A docking stand for an electronic device comprising:
a bottom support surface configured to support a bottom side of the electronic device;
a back support surface configured to support a side of the electronic device, the back support surface being substantially upright when a base of the docking stand is placed on a substantially horizontal surface;
a docking connector configured to removably attach to a docking port of the electronic device, the docking port being proximate to the bottom side of the electronic device;
an adjustment mechanism configured to adjust a height of the docking connector relative to the bottom support surface; and
an adjustment sled comprising a channel,
wherein:
- a first portion of the channel is higher than a second portion of the channel when the base of the docking stand is placed on the substantially horizontal surface; and
- an adjustment of the adjustment mechanism is configured to move the adjustment sled substantially parallel with the base of the docking stand and adjust a height of a connector assembly pivot within the channel.

12. The docking stand of claim 11, wherein the adjustment mechanism comprises an adjustment wheel.

13. The docking stand of claim 11, wherein the adjustment mechanism is located at a rear portion of the docking stand behind the back support surface.

14. The docking stand of claim 11, wherein:
- the docking connector is configured to pivot frontward and rearward relative to the back support surface; and
- the docking stand is configured to support the docking connector in a substantially vertical configuration when the docking connector is detached from the docking port of the electronic device.

15. The docking stand of claim 11, wherein the bottom support surface is convexly curved relative to the docking stand.

16. The docking stand of claim 11, wherein a rear portion of the bottom support surface is lower than a front portion of the bottom support surface when the base of the docking stand is placed on the substantially horizontal surface.

17. The docking stand of claim 11 further comprising a cable comprising a USB plug.

18. The docking stand of claim 11, wherein the docking connector comprises an eight-pin Lightning connector.

19. The docking stand of claim 11 further comprising:
a connector assembly comprising the docking connector,
wherein:
- the bottom support surface comprises a connector well; and
- the connector assembly is configured to be raised and lowered within the connector well.

20. The docking stand of claim 19, wherein the connector well is fanned out upward toward the bottom support surface.

* * * * *